(12) United States Patent
Needham

(10) Patent No.: US 6,898,891 B1
(45) Date of Patent: May 31, 2005

(54) MULTI-PURPOSE FISHING TOOL

(76) Inventor: Michael A. Needham, 3824 Observatory Rd. H, Cross Plains, WI (US) 53528

( * ) Notice: Subject to any disclaimer, the term of this patent is extended or adjusted under 35 U.S.C. 154(b) by 0 days.

(21) Appl. No.: 10/622,724

(22) Filed: Jul. 18, 2003

(51) Int. Cl.[7] .............................................. A01K 97/14
(52) U.S. Cl. ....................................... 43/4; 5/6; 5/54.1
(58) Field of Search ............................. 43/4, 5, 6, 54.1; 7/106, 33, 485; 294/24; D22/149

(56) References Cited

U.S. PATENT DOCUMENTS

| | | | |
|---|---|---|---|
| 452,278 A * | 5/1891 | McILvaine | 177/233 |
| 3,004,362 A * | 10/1961 | Day | 43/6 |
| 3,150,460 A * | 9/1964 | Dees | 43/4 |
| 3,467,116 A | 9/1969 | Ringewaldt | |
| 3,735,542 A | 5/1973 | Kocian | |
| 3,747,253 A * | 7/1973 | Gangi et al. | 43/4 |
| 3,803,742 A * | 4/1974 | Foster | 43/4 |
| 4,004,539 A | 1/1977 | Wesson | |
| 4,253,262 A | 3/1981 | Johnson | |
| 4,769,939 A * | 9/1988 | Gonska et al. | 43/4 |
| 5,197,218 A | 3/1993 | Legard | |
| 5,228,226 A * | 7/1993 | Porosky | 43/5 |
| D370,049 S | 5/1996 | Acker | |
| 5,628,538 A | 5/1997 | Ericksen | |
| 5,788,608 A | 8/1998 | Wilkinson | |

* cited by examiner

Primary Examiner—Kurt Rowan
(74) Attorney, Agent, or Firm—DeWitt Ross & Stevens S.C.; Charles S. Sara

(57) ABSTRACT

The present invention provides a multi-purpose tool for use in outdoor activities and, in particular, ice fishing and shore fishing. The tool is particularly useful as a tip-up marker and equipment caddy. The tool also includes a variety of interchangeable tips such that it can be used for hiking, chipping ice and gaffing fish.

12 Claims, 3 Drawing Sheets

MULTI-PURPOSE FISHING TOOL

FIELD OF THE INVENTION

The invention is generally directed to a tool for use in fishing, more specifically ice fishing, shore fishing, and stream fishing.

BACKGROUND OF THE INVENTION

Fishing is a popular past time that is enjoyed in most areas having a proximity to water. By necessity, fishing requires the use of, at least, several pieces of equipment and multiple pieces of tackle. In addition, in many instance the fisherman is required to hike or travel to a desired fishing spot. Consequently, the fisherman must take multiple pieces of equipment and tackle with him or abandon some equipment in the interest of ease of travel.

Further, some types of fishing are more demanding than others. One of the more demanding forms of fishing is ice fishing. By its nature, ice fishing must occur outdoors in freezing temperatures and possibly other inclement weather conditions as well. Because of the physical climate necessary to practice ice fishing, some special tools are required. These tools may include an auger for boring a hole through the ice, a tip-up for marking the hole in deep snow and other tools, such as a rake for clearing the snow from the surface of the ice and an ice chipper to prevent the hole from freezing over once it has been drilled. In addition, one of the most appealing aspects of ice fishing is that it allows the fisherman to get out on the surface of a lake without the aid of a boat. This requires hiking over ice and/or snow, sometimes over long distances, while carrying equipment and tackle for fishing.

The need for carrying multiple articles of fishing equipment long distances to a fishing site means that tools which have multiple uses or which ease the burden of carrying equipment are desirable. Such desirable qualities include uses for transport of supplies, uses for hiking in various terrains and uses for retaining fishing tackle and other fishing equipment at the fishing site. Ideally, the multi-use tool should be adapted for use year round and for various forms of fishing. These include, shore fishing, boat fishing, trout fishing, fly fishing and especially ice fishing.

SUMMARY OF THE INVENTION

The invention provides a multi-use tool for use in fishing. The tool can be used in most forms of fishing including shore fishing, boat fishing, trout fishing, fly fishing ice fishing. The tool can be used to carry other fishing equipment and tackle, easing the burden of transporting equipment and tackle to the fishing site. Further, when used for ice fishing, the tool can be used for carrying multiple pieces of fishing equipment across a frozen lake to a fishing hole. In ice fishing, the tool can be used for maintaining the fishing hole, for hiking across an icy lake and marking the site of the hole in snowy conditions when it becomes difficult to see.

In a particularly favored version, the fishing tool has a shaft with a handle end and an opposing tip end. Further, the handle end has a grip, and the tip end is adapted to receive a plurality of interchangeable tips. The tips are designed and configured to be removably attached to the tip end. The device further includes a plurality of hooks arranged along the sides and a plurality of base arms situated below a plurality of strap cleats. Accordingly, when a container is placed on a base arm such that the bottom of the container is supported by the base arm and a strap is secured around the container through the strap cleat, the container is securely fastened to the device. In addition, there is a plurality of apertures or attachment slots passing completely through the shaft of the tool which are dimensioned to allow the insertion of straps similar to those used in the strap cleat. Straps inserted through the attachment slots may be used in conjunction with the base arms or may be used alone to strap equipment such as poles or nets to the tool. In addition, at least one face of the shaft is ruled so as to allow its use for measuring purposes.

The tool also has other advantages. By selecting an appropriate tip, the variety of uses for the tool is further expanded. The tips may be selected for hiking, to provide greater traction on ice or snow and fishing by use as a gaff or club. It can be used as a carrying device by securely attaching a plurality of objects to it. By selecting the pick end, the tool may be used as a pick or marker. For instance, by selecting the pick tip and driving the pick into the ice, snow or sandy beach the tool can be used as a monopod for marking the fishing hole or other salient features of the snowy terrain. As described in more detail later, there is a plurality of fasteners along the length of the tool by which to secure a fish line or bait line. There are attachment cleats and attachment slots, allowing storage or tackle jars to be secured along its length. Conveniently, the cleats can also secure a beverage can.

Further advantages of the invention will appear from a complete review of the Drawings and the Detailed Description of the Invention which appear below.

BRIEF DESCRIPTION OF THE FIGURES

FIG. 3a is a perspective view of an ice chipper suitable for use with the device shown in FIGS. 1 and 2.

FIG. 3b is a perspective view of a fish gaff suitable for use with the device shown in FIGS. 1 and 2.

FIG. 3c is a perspective view of one version of a foot tip suitable for use with the device shown in FIGS. 1 and 2.

FIG. 3d is a perspective view of a second version of a foot tip suitable for use with the device shown in FIGS. 1 and 2.

FIG. 3e is a perspective view of the pick end suitable for use with the device shown in FIGS. 1 and 2.

FIG. 3f is a cross sectional view of the interior of the foot tip for use with the device shown in FIGS. 1 and 2.

DETAILED DESCRIPTION OF THE INVENTION

Figure 1:
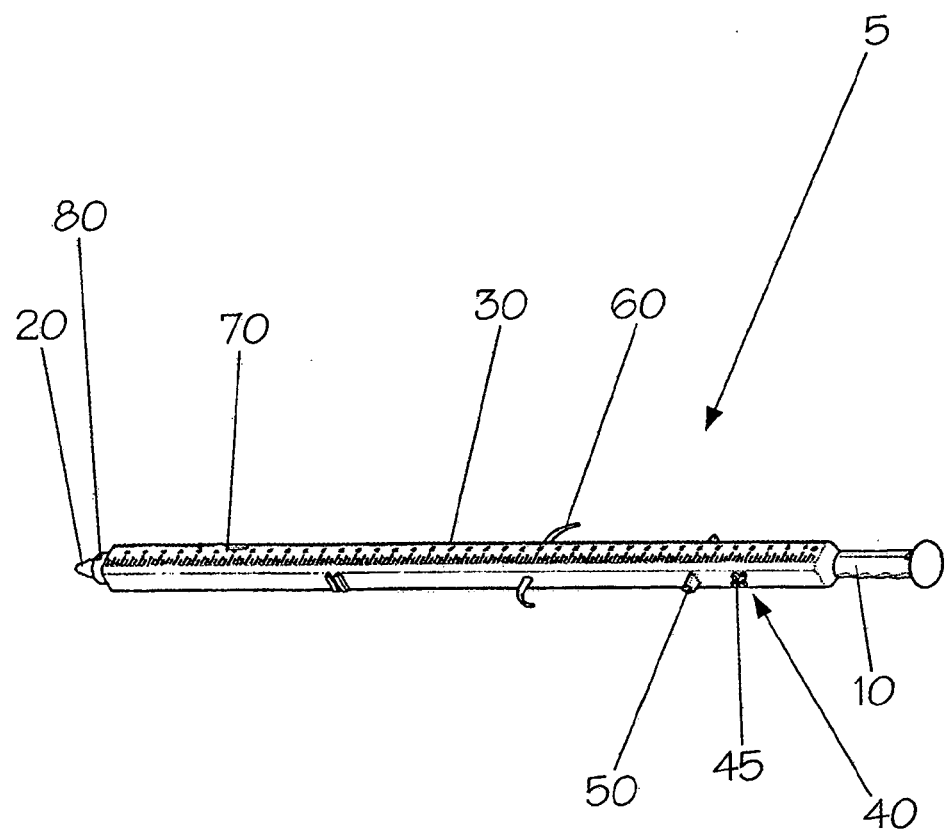
FIG. 1 is a perspective view of an exemplary fishing tool in accordance with the invention.
Figure 2:
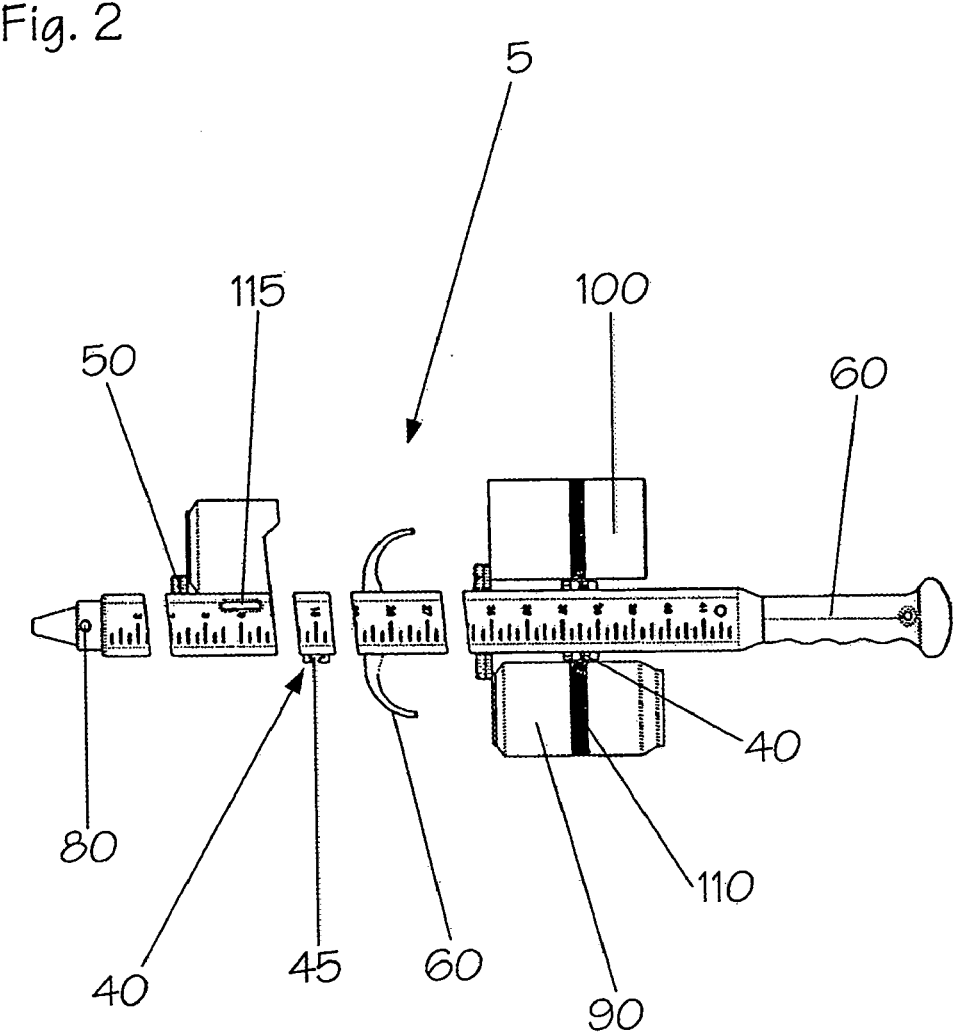
FIG. 2 is an exploded diagram of the exemplary fishing tool shown in FIG. 1 illustrating features of the tool in detail.

FIGS. 1 and 2 illustrate a fishing tool 5 exemplifying a preferred version of the invention. The fishing tool 5 has a square shaft 30 measuring between about three feet and five feet long. One end of the shaft has a grip 10 defining a handle. The opposing tip end 20 has a conical shape wherein a plurality of different tips may be interchangeably attached, the tips having different functions as described below. The shaft 30 is designed to have a plurality of fastening devices along its length, including strap cleats 40, container base arms 50, hooks 60 and attachment slots 115.

FIG. 2 is an exploded view of the fishing tool 5, showing in greater detail features illustrated in FIG. 1. A storage container 100 and a beverage container 90 rest on the base arms 50 and are restrained by straps 110 passing through a strap cleat 40. Further, an attachment slot 115 passes through the shaft, such that a strap 110 passed through the attachment slot 115 can securely bind a can, fishing rod or other object securely to the shaft 30 of the tool 5. In addition, at least one face 70 of the device is ruled, allowing fish, depth of water, thickness of ice or other features to be measured.

In a preferred version, the straps 110 are passed through the strap cleat 40 or attachment slot 115 and are fastened using VELCRO. However, other fasteners, such as adjustable buckles, snaps, eyehooks or similar fasteners may be used. In other versions, the straps 110 may have a button or toggle (not shown) dimensioned and configured to be removably inserted into horizontal and vertical grooves 45 formed by the cleat 40. In this version, the strap 110 remains attached to the secured object and the button (not shown) is easily attached and detached to the shaft 30 via the grooves in the cleat 40. The strap 110 can be attached to the shaft 30 and fastened around a fishing accessory 90 and 100 shown here as a beverage container and storage container, respectively. The base arms 50 are paired with a strap cleat 40 such that a can 90 or storage jar 100 rests on a base arm 50. A strap 110 can then be inserted in the strap cleat 40 and fastened around a container 90 or 110 so as to securely fasten the container 90 or 110 to the shaft.

Figure 3:
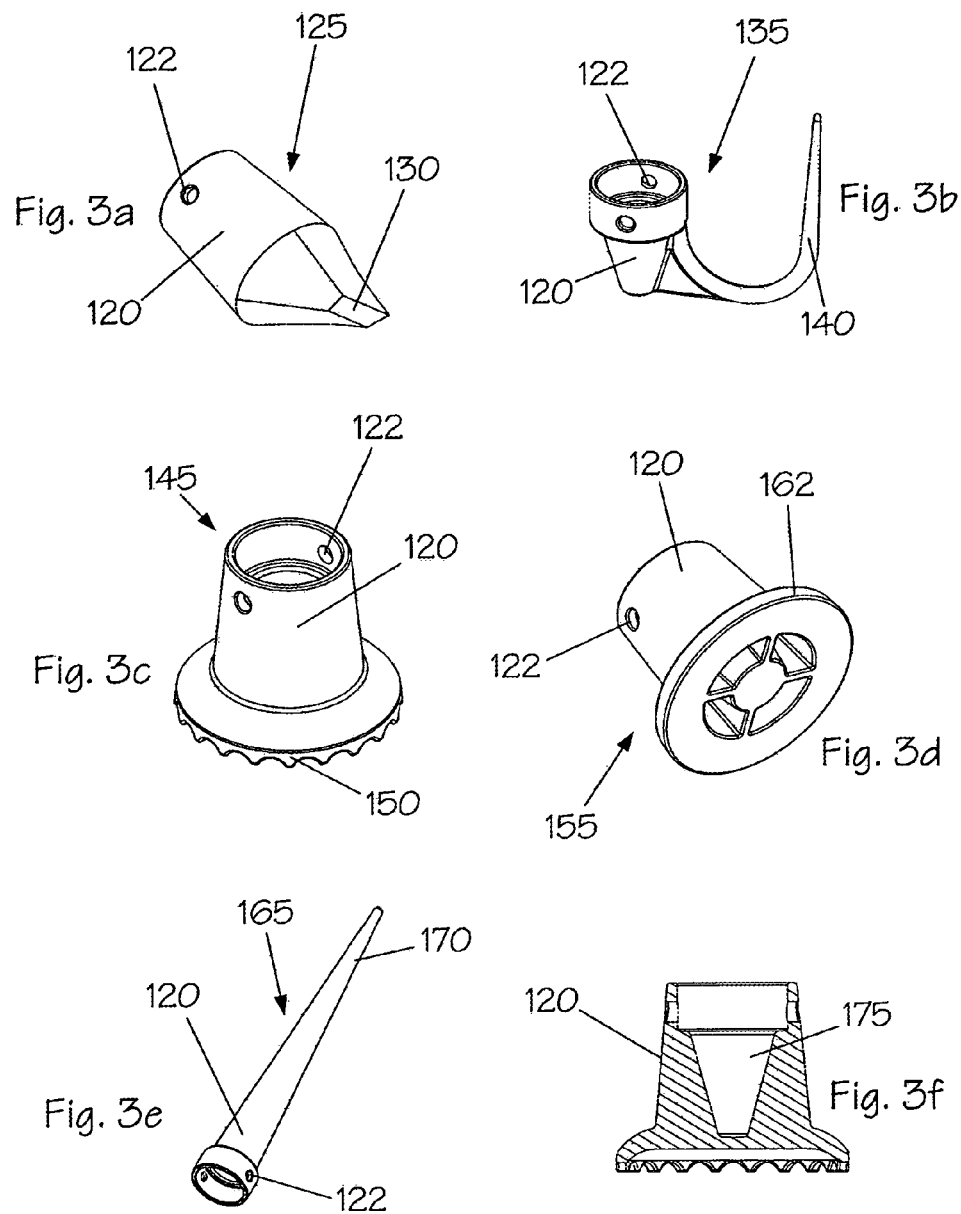
FIG. 3 is a perspective view of the interchangeable tips of the disclosed tool.

The tool has other features which aid in fishing. For example, the tip end 20 has an attachment hole 80 used for securing a plurality of interchangeable tips 125, 135, 145, 155 and 165 (illustrated in FIG. 3) to the tool 5. The tips 125, 135, 145, 155 and 165 can be secured to the tip end 20 with any suitable fastener. The tip end 20 is designed to have a conical shape dimensioned and configured to mate with the interior of the interchangeable tips 125, 135, 145, 155 and 165 shown in FIG. 3f.

Referring now to FIGS. 3a–f, there can be seen examples of the interchangeable tips 125, 135, 145, 155 and 165 used with the tool 5. The tips 125, 135, 145, 155 and 165 serve a variety of functions, but all are designed to have a base 120 which complementarily mates with the tip end 20 of the tool 5 and juxtaposes a toggle hole 122 and an attachment hole 80 when the tip is securely set on the tip end 20. The interior receptacle of the tip base fits over the tip end 20 and is secured by use of a fastener (not shown). The fastener (not shown) is inserted through the toggle hole 122 of the tip 125, 135, 145, 155 or 165 and passes through the attachment hole 80 at the tip end 20 of the tool 5. While any fastener which secures a tip 125, 135, 145, 155 or 165 to the tip end 20 would be appropriate, in preferred versions, the fastener (not shown) is a cotter pin or linchpin, although a bolt or screw would also secure the tip 125, 135, 145, 155 or 165 to the tip end 20.

FIG. 3a illustrates an ice chipper tip 125. The ice chipper 125 has a base 120 whose interior (illustrated in FIG. 3f) mates with the tip end 20 (FIGS. 1 and 2) of the tool 5. The ice chipper 125 is designed to have a chisel-like tip having an edge 130 which is useful in chipping ice from an ice hole or clearing frozen snow from the fishing site. Also shown is the toggle hole 122 which mates with the attachment hole 80 on the tip end 20 of the shaft 30 (illustrated in FIGS. 1 and 2).

FIG. 3b illustrates a fish gaff or hook tip 135. Similar to the ice chipper 125, the fish gaff 135 includes a base 120 which fits over the tip end 20 and is secured by inserting a fastener through the toggle hole 122 and attachment hole 80. The gaff tip 135 allows the tool to be used as a gaff by hooking the fish and bringing it out of the hole and onto the ice. In addition, the gaff tip 135 can also be used as a boat hook when fishing on a boat.

FIGS. 3c and 3d illustrate two different foot tips 145 and 155, respectively. FIG. 3c illustrates a foot tip 145 optimized for use on ice having scalloped edges 150 for biting into ice and snow. As with the other tips 125, 135, 155 and 165, the scalloped foot tip 145 has a base which assures the tip 145 sits properly on the tip end 20 of the shaft 30 of the tool 5. FIG. 3d illustrates a flat foot tip 155 optimized for use on dry or soft terrain. As illustrated, the flat foot tip 155 has a central base 120 which fits over the tip end 20 and is secured through the toggle hole, as described previously. The foot tip 155 has radial spokes 160 which support an annular ring 162 surrounding the base 120. This design provides a large flat surface for planting the shaft on flat or soft ground. Using the flat foot tip 155 permits the tool to stand upright on its own, allowing the tool to be used as a monopod on a hard flat surface.

FIG. 3e illustrates a pick tip 165. Like the other tips 125, 135, 145 and 155, the pick tip 165 has a base 120 which mates with the tip end 20 and attaches through the attachment hole 80. Sheathed over the base 120 is an elongated pick 170 which allows the tool 5 to be impaled in the snow or ice, providing a stationary marker and allowing easy reference in snow-covered terrain. In addition, the pick tip 165 can be used in shore fishing by driving the pick tip into the sandy shore, thus providing a scaffold on which to rest a fishing pole while fishing, securing a stringer line holding fish and providing a monopod for many other uses.

FIG. 3f is a cross section of the foot tip 145 shown in FIG. 3c and illustrating the interior of the base 120 of the tips shown in FIGS. 3a–3e. Depicted is the concave interior 175 of the base 120, complementing the exterior profile of the tip end 20 of the tool 5.

The tool has other features which can be used for fishing. For example, the tool 5 can aid in carrying fishing tackle and other gear across the ice to the fishing site. The strap cleats 40 and attachment slots 115 can be used to attach many fishing accessories to the shaft 30 of the tool 5 for the hike across the ice. Such accessories may include fishing poles, nets, camping utensils and many other items. In addition, hooks 60 are arranged along the shaft to which equipment can be attached during the hike to the fishing site or during fishing. For example, when the pick tip 165 is attached to the shaft 30 and the tool 5 is driven in the snow or sand adjacent to the fishing hole, the tool provides a convenient scaffold allowing fish stringers to be attached to the hooks, fishing poles to be rested against the hooks or attachment of other tackle to the pole conveniently located next to the fishing hole. It is further contemplated that the storage canisters 100 store tackle and bait. By driving the tool 5 into the snow next to the fishing hole, the tool 5 acts as a marker for the fishing hole in deep snow. Further, by attaching the fishing tackle to the tool 5 and anchoring the tool 5 in the ground next to the fishing hole, fishing tackle is conveniently stored adjacent to the fishing hole off of the snow and ice.

In addition, the versatility of the tool 5 is further increased by providing for the easy interchangeability of the plurality of different tips used with the tool 5. By use of the appropriate tip, the fisher can use the tool 5 as a walking stick, for hiking on a frozen lake, through snow or on clear ground. The fisher can use the tool 5 to aid in clearing off the surface of the ice to allow for drilling a hole.

Further, while the tips shown in FIGS. 3a–3e provide a wide range of uses other tips are contemplated which would further extend the versatility of the tool. For instance, the tool may be provided with a tip comprising a net, for retrieving fish or a gig for catching fish when they are not biting or a spring scale for measuring weight of the fish. A rake type end or shovel type end may be provided for use in preparing a fire pit, for example when camping.

Other functions of the tool 5 are also contemplated. The tool 5 can be used as a measuring device to determine the depth of the water, the ice or for measuring fish. The hooks 60 on the side of the shaft 30 allow the sportsman to hang buckets, ice spoons and other gear from the tool 5 while hiking to his campsite or fishing site.

The same attributes which make the tool an excellent tool for fishing also make it an excellent tool for outdoor activities in general. Such activities include, snowshoeing, hiking, camping and cross-country skiing. Specifically, the tool 5 is particularly suited to carrying fishing equipment, securing fishing or stringer lines and providing a convenient place for keeping tackle and bait while fishing. Further, many different implements used in outdoor activities, may to be strapped to the tool 5, by use of the straps 110 and attachment slots 115 or cleats 40.

In other versions, the tool 5 may serve as a camera monopod. By securing the pick end 165 to the tip end 20 of the shaft 30 and driving the pick 170 into the ground, the tool will remain upright. The handle 10 optionally has a threaded bore (not shown) at the apex by which a camera is secured to the tool. When the bore (not shown) is not in use, a compass may be screwed into it so as to provide a convenient reference tool when used in hiking or camping.

Other versions and uses of the invention will be apparent to those skilled in the art from consideration of the specification and practice of the invention disclosed herein. The invention is not intended to be limited to the referred versions of the invention described above, but rather is intended to be limited only by the claims set out below. It is intended that the specification and examples only be considered exemplary with the true scope and spirit of the invention indicated by the following claims.

What is claimed is:

1. A fishing tool comprising:
    a. a shaft having:
        (1) a handle end,
        (2) an opposing tip end,
        (3) a container base arm,
        (4) a strap cleat spaced from the base arm,
        (5) a strap extending through the strap cleat, and
        (6) an attachment slot passing through the shaft, the attachment slot being dimensioned to receive the strap therein;
        whereby the strap may be wrapped about an object to affix the object to the shaft; and
    b. a plurality of different tips, each tip being interchangeably attachable to the tip end.

2. The tool of claim 1 wherein the shaft is ruled, whereby the tool may be used for measuring purposes.

3. The tool of claim 1 wherein hooks are spaced along the shaft.

4. The tool of claim 1 wherein the shaft is between about three feet tall and five feet tall.

5. The tool of claim 1 wherein:
    a. the tip end has an attachment hole and the tips each have a toggle hole,
    b. attachment of one of the tips on the tip end adjacently aligns the toggle hole of the tip and the attachment hole, allowing passage of a fastener through the attachment hole and the toggle hole to fasten the tip to the tip end.

6. The tool of claim 1 wherein the tips include:
    a. a chipping tip having an interior pocket adapted to complementarily receive the tip end therein, and a chisel opposite the pocket; and
    b. a base tip having an interior pocket adapted to complementarily receive the tip end therein, and an enlarged planar base opposite the pocket.

7. The tool of claim 1 wherein the tips include:
    a. a pick tip having an interior pocket adapted to complementarily receive the tip end therein, and an elongated tip opposite the pocket; and
    b. a gaff tip having an interior pocket adapted to complementarily receive the tip end therein, and a curved hook opposite the pocket.

8. The tool of claim 6 wherein:
    a. the tip end has an attachment hole and the tips have a toggle hole,
    b. attachment of one of the tips on the tip end adjacently aligns the attachment hole of the tip end and the toggle hole, allowing passage of a fastener through the attachment hole and the toggle hole to fasten the tip to the tip end.

9. The tool of claim 6 wherein the tips include:
    a. a chipping tip having an interior pocket adapted to complementarily receive the tip end therein, and a chisel opposite the pocket;
    b. a base tip having an interior pocket adapted to complementarily receive the tip end therein, and an enlarged planar base opposite the pocket;
    c. a pick tip having an interior pocket adapted to complementarily receive the tip end therein, and an elongated tip opposite the pocket; and
    d. a gaff tip having an interior pocket adapted to complementarily receive the tip end therein, and a curved hook opposite the pocket.

10. The tool of claim 6 wherein hooks are spaced along the shaft.

11. The tool of claim 6 wherein the shaft is between about three feet tall and five feet tall.

12. A fishing tool comprising:
    a. a shaft having:
        (1) ruled calibrations on the shaft, whereby the calibrations can be used for measuring objects,
        (2) a handle end,
        (3) an opposing tip end,
        (4) a base arm,
        (5) a strap cleat spaced from the base arm,
        (6) a strap extending through the strap cleat,
        (7) an attachment slot passing through the shaft, the attachment slot being dimensioned to receive the strap therein;
        whereby the strap may be wrapped about an object abutting the base arm to affix the object to the shaft;
    b. a plurality of different tips, each tip being interchangeably attachable to the tip end.

* * * * *